(12) United States Patent
Tian

(10) Patent No.: US 9,779,522 B2
(45) Date of Patent: Oct. 3, 2017

(54) METHOD FOR PROCESSING INFORMATION AND ELECTRONIC DEVICE

(71) Applicants: Beijing Lenovo Software Ltd., Beijing (CN); Lenovo (Beijing) Co., Ltd., Beijing (CN)

(72) Inventor: Fulei Tian, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 166 days.

(21) Appl. No.: 14/584,705

(22) Filed: Dec. 29, 2014

(65) Prior Publication Data
US 2016/0019703 A1    Jan. 21, 2016

(30) Foreign Application Priority Data

Jul. 21, 2014    (CN) .......................... 2014 1 0347323

(51) Int. Cl.
*G06T 3/00* (2006.01)
*G06T 3/40* (2006.01)
(Continued)

(52) U.S. Cl.
CPC .............. *G06T 11/203* (2013.01); *G06K 9/52* (2013.01); *G06T 1/60* (2013.01); *G06T 3/40* (2013.01);
(Continued)

(58) Field of Classification Search
None
See application file for complete search history.

(56) References Cited

U.S. PATENT DOCUMENTS 8,406,562 B2    3/2013    Bassi et al.
8,768,094 B2    7/2014    Bassi et al.
(Continued)

FOREIGN PATENT DOCUMENTS

| CN | 101136192 A | 3/2008 |
| CN | 103455255 A | 12/2013 |
| CN | 103674350 A | 3/2014 |

OTHER PUBLICATIONS

First Chinese Office Action regarding Application No. 201410347323.8 dated Oct. 24, 2016. English translation provided by Unitalen Attorneys at Law.

*Primary Examiner* — Tize Ma
(74) *Attorney, Agent, or Firm* — Harness, Dickey & Pierce, P.L.C.

(57) ABSTRACT

A method for processing information and an electronic device are disclosed according to the disclosure, and a display unit of the electronic device is capable of being bended with certain curvature. The method includes: once notification signal for notifying the electronic device that a first plane image needs to be displayed is received, detecting and obtaining current bending state parameters for characterizing a current bending state of the display unit based on the notification signal; acquiring the first plane image from memory; performing image processing on the first plane image according to the current bending state parameters; and transmitting the second image to video memory of the display unit, to make a projected image of the second image on a preset plane is the same as the first plane image when the second image is displayed on the display unit of the curved shape.

8 Claims, 3 Drawing Sheets

(51) Int. Cl.
*G06T 11/20* (2006.01)
*G06K 9/52* (2006.01)
*G06T 1/60* (2006.01)
*G09G 3/20* (2006.01)
*G06K 9/46* (2006.01)
*G09G 5/373* (2006.01)

(52) U.S. Cl.
CPC ....... *G09G 3/20* (2013.01); *G06K 2009/4666* (2013.01); *G09G 5/373* (2013.01); *G09G 2320/103* (2013.01); *G09G 2340/0407* (2013.01); *G09G 2380/02* (2013.01)

(56) References Cited

U.S. PATENT DOCUMENTS

| | | | |
|---|---|---|---|
| 2005/0127376 A1* | 6/2005 | Young | H01L 27/3225 257/80 |
| 2006/0228091 A1 | 10/2006 | Lee | |
| 2006/0280376 A1* | 12/2006 | Lei | H04N 3/2335 382/275 |
| 2008/0062164 A1* | 3/2008 | Bassi | H04N 9/3147 345/214 |
| 2013/0141593 A1 | 6/2013 | Bassi et al. | |
| 2013/0321260 A1 | 12/2013 | Joo | |
| 2015/0009129 A1* | 1/2015 | Song | G06F 1/1652 345/156 |
| 2016/0180498 A1* | 6/2016 | Kobayashi | G02B 27/0172 345/9 |

* cited by examiner

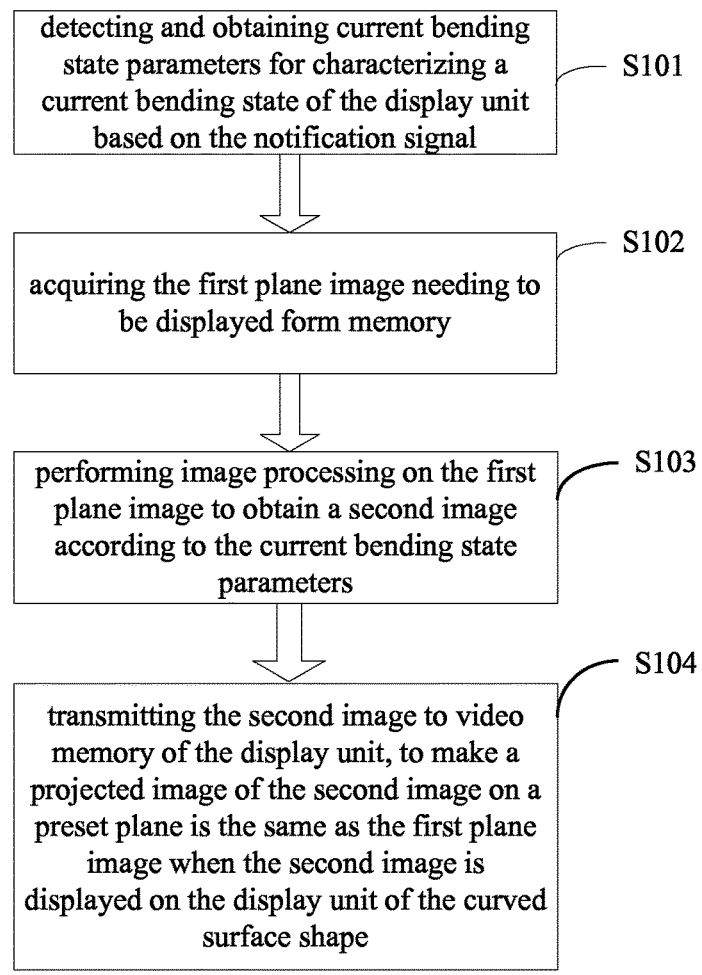
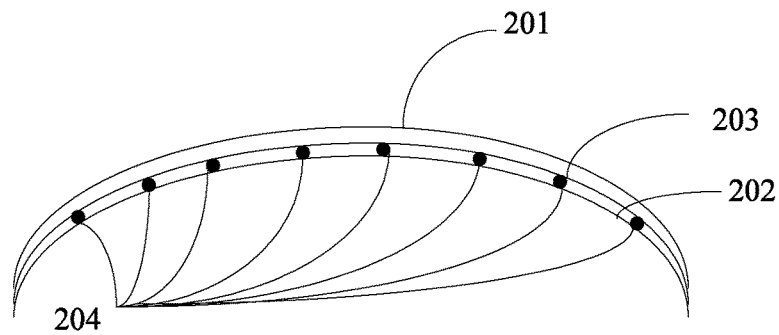
Figure 1
Figure 2

METHOD FOR PROCESSING INFORMATION AND ELECTRONIC DEVICE

CROSS-REFERENCES TO RELATED APPLICATIONS

This application claims priority to Chinese Patent Application No. 201410347323.8, filed with the State Intellectual Property Office of People's Republic of China on Jul. 21, 2013 entitled "METHOD FOR PROCESSING INFORMATION AND ELECTRONIC DEVICE", the content of which is incorporated herein by reference in its entirety.

FIELD

The disclosure relates to the technical field of electronics, in particular to a method for processing information and an electronic device.

BACKGROUND

With rapid development of electronic technology, people's lives are more closely linked with network and various electronic products with different functions. With improved living standards, while portable electronic products such as PAD and smart phones are widely used, wearable smart electronic products easier to be carried are developing rapidly.

Presently, to satisfy diversified requirements of users, one development trend of the wearable smart electronic products is to use a flexible screen which is bendable as a display unit of an electronic device, so that the electronic device may fit closer to body parts of the user.

In the conventional technology, a user has a poor experience if he/she views a plane image displayed on a display unit which is in a bending state.

SUMMARY

Through a method for processing information and an electronic device provided according to the embodiments of the disclosure, a technical problem that for a conventional electronic device, when a display unit is bended, a plane image needing to be displayed is bended as the display unit is bended, thus visual effect is poor, is solved.

In one aspect, technical solutions are provided according to the embodiments of the disclosure in the following.

A method for processing information is applied to an electronic device with a display unit, and the display unit has an ability of being bended with certain curvature, the method includes:

once notification signal for notifying the electronic device that a first plane image needs to be displayed is received, detecting and obtaining current bending state parameters for characterizing a current bending state of the display unit based on the notification signal;

acquiring the first plane image from memory;

performing image processing on the first plane image to obtain a second image according to the current bending state parameters; and transmitting the second image to video memory of the display unit, to make a projected image of the second image on a preset plane is the same as the first plane image when the second image is displayed on the display unit of the curved surface shape.

Optionally, in a case that the display unit includes a display layer disposed on a surface of the display unit, an elastic layer disposed between the display layer and internal components of the electronic device, and pressure sensing units disposed between the display layer and the elastic layer, obtaining current bending state parameters for characterizing a current bending state of the display unit includes: obtaining, through the pressure sensing units, parameters of current pressure from the display layer and the elastic layer on the pressure sensing units, and calculating the current bending state parameters for characterizing the current bending state of the display unit based on the current pressure parameters.

Optionally, the current bending state parameters include a current bending position parameter for characterizing a position for a bending area of the display unit which is in a bending state currently, and a current bending radian parameter of the bending area.

Optionally, performing image processing on the first plane image to acquire a second image according to the current bending state parameters includes: performing, according to the current bending state parameters, interpolation processing on the first plane image to obtain the second image through a k-means algorithm or a trend simulation algorithm.

Optionally, after interpolation processing is performed on the first plane image to obtain the second image through the k-means algorithm or the trend simulation algorithm, the method further includes: in a concave area of the surface of the display unit, performing local zoom processing on the second image according to the current bending state parameters and preset display position parameters for characterizing a display position of the second image on the display unit, so that the display size of the second image displayed on the display unit gradually decreases along a direction from a vertex of the concave area to a endpoint of the concave area; or in a convex area of the surface of the display unit, performing local zoom processing on the second image according to the current bending state parameters and the display position parameters, so that the display size of the second image displayed on the display unit gradually increases along a direction from a vertex of the convex area to a endpoint of the convex area.

In another aspect, an electronic device is further provided according to an embodiment of the disclosure. The electronic device includes a display unit which has an ability of being bended with certain curvature, and the electronic device further includes:

a detecting unit, configured to detect current pressure parameters sensed by pressure sensing units of electronic device based on a notification signal for notifying the electronic device that a first plane image needs to be displayed once the notification signal is received;

a calculation unit, configured to calculate current bending state parameters for characterizing a current bending state of the display unit according to the current pressure parameters detected by the detecting unit;

a memory unit, configured to store the first plane image;

an image processing unit, configured to perform image processing on the first plane image stored in the memory unit to generate a second image based on the current bending state parameters calculated by the calculation unit; and a video memory unit, configured to receive the second image generated by the image processing unit, and display the second image on the display unit, where on a preset plane, a projected image of the second image displayed on the display unit of the curved surface shape is the same as the first plane image.

Optionally, the display unit includes: a display layer disposed on a surface of the display unit, an elastic layer disposed between the display layer and components of the electronic device, and the pressure sensing units which are disposed between the display layer and the elastic layer and are capable of acquiring the parameters of current pressure from the display layer and the elastic layer on the pressure sensing units.

Optionally, the electronic device further includes an acquiring unit configured to acquire the first plane image from the memory unit, and transmit the first plane image to the image processing unit.

Optionally, the image processing unit is further configured to perform, according to the current bending state parameters, interpolation processing on the first plane image to obtain the second image through a k-means algorithm or a trend simulation algorithm.

Optionally, the image processing unit is further configured to in a concave area of the surface of the display unit, perform local zoom processing on the second image according to the current bending state parameters and preset display position parameters for characterizing a display position of the second image on the display unit, so that the display size of the second image displayed on the display unit gradually decreases along a direction from a vertex of the concave area to a endpoint of the concave area; or in a convex area of the surface of the display unit, perform local zoom processing on the second image according to the current bending state parameters and the display position parameters, so that the display size of the second image displayed on the display unit gradually increases along a direction from a vertex of the convex area to a endpoint of the convex area.

One or more technical solutions provided according to embodiments of the disclosure have at least following technical effects or advantages.

Through the method and the electronic device provided according to the embodiments of the disclosure, image processing is performed on a first plane image needing to be displayed to obtain a second image according to bending state parameters of a display unit, so that on a preset plane, a projected image of the second image displayed on the display unit of a curved surface shape is the same as the first plane image. Therefore, a user views same content from both the second image displayed on the bending display unit and the first plane image displayed on the flat display unit, so as to improve visual effect and user experience.

BRIEF DESCRIPTION OF THE DRAWINGS

FIG. 1 is a flow chart of a method for processing information according to a first embodiment of the disclosure;

FIG. 2 is a schematic diagram of a display unit provided with built-in pressure sensors according to the first embodiment of the disclosure;

DESCRIPTION

Figure 3:
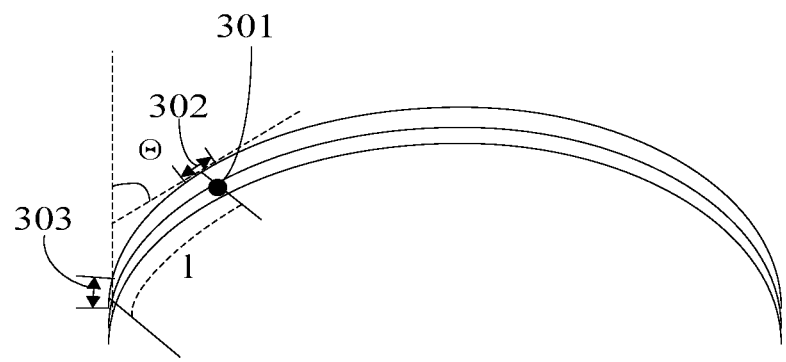
FIG. 3 is a schematic diagram for calculating current bending state parameters according to the first embodiment for the disclosure.

There are provided a method for processing information and an electronic device according to the embodiments of the disclosure, by which visual effects and user experience can be improved.

To achieve the object, the general idea of the technical solutions provided according to the embodiments of the disclosure is as follows.

A method for processing information is applied to an electronic device with a display unit, and the display unit is capable of being bended with certain curvature. The method includes:

once notification signal for notifying the electronic device that a first plane image needs to be displayed is received, detecting and obtaining current bending state parameters for characterizing a current bending state of the display unit based on the notification signal;

acquiring the first plane image from memory;

performing image processing on the first plane image to obtain a second image according to the current bending state parameters; and transmitting the second image to video memory of the display unit, to make a projected image of the second image on a preset plane is the same as the first plane image when the second image is displayed on the display unit of a curved surface shape.

It is may be seen from the foregoing content that image processing is performed on the first plane image to acquire the second image according to the bending state parameter of the display unit, so that on the preset plane, the projected image of the second image displayed on the display unit bended in the curved surface shape is the same as the first plane image. Therefore, a user views same content from both the second image displayed on the bending display unit and the first plane image displayed on the flat display unit, so as to improve visual effect and user experience.

To better understand the foregoing technical solutions, the technical solutions are described in detail together with drawings and embodiments.

First Embodiment

A method for processing information, applied to an electronic device, is provided according to the first embodiment. The electronic device has a display unit, which is capable of being bended with a certain curvature. Referring to FIG. 1, which is a flow chart of the method for processing information according to the first embodiment of the disclosure, the method includes following steps.

Step 101 includes: once notification signal for notifying the electronic device that a first plane image needs to be displayed is received, detecting and obtaining current bending state parameters for characterizing a current bending state of the display unit based on the notification signal.

Step 102 includes: acquiring the first plane image from memory.

Step 103 includes: performing image processing on the first plane image to obtain a second image according to the current bending state parameters.

Step 104 includes: transmitting the second image to video memory of the display unit, to make a projected image of the second image on a preset plane is the same as the first plane image when the second image is displayed on the display unit of the curved surface shape, on a preset plane.

In practical application, the electronic device may be a smart watch, a smart band, a smart headset device, a smart phone, or a tablet computer, etc, and is not enumerated according to the embodiment.

In a specific implementation process, the display unit may be a flexible display screen, or a thin display screen with certain flexibility, which is capable of being bended with certain curvature.

The method for processing information provided according to the embodiment of the disclosure may not only be applied to a case that a still image is displayed on a bending display unit, but also be applied to a case that a dynamic video image is displayed on the bending display unit, and is not limited according to the embodiment.

The method for processing information provided according to the first embodiment is described step by step in detail in the following together with FIG. 1.

First, in step S101, once notification signal for notifying the electronic device that a first plane image needs to be displayed is received, a current bending state parameter for characterizing a current bending state of the display unit are detected and obtained based on the notification signal.

In a specific implementation process, the notification signal may be generated in response to selection operation after the selection operation for selecting the first plane image is received.

For example, the notification signal may be generated after the user clicks and selects the first plane image pre-stored in a picture library.

Alternatively, the notification signal may be generated in response to switching operation after the switching operation for switching to a display effect optimization mode is received, Notification signal generated after the user clicks a preset button of the electronic device or the display effect optimization mode is selected to be entered from setting options of the electronic device. In this case, the first plane image is a current displaying image of the display unit of the electronic device.

According to the embodiment of the disclosure, to accurately characterize the bending state of the display unit, the current bending state parameters include at least a bending position parameter for characterizing a position for a bending area of the display unit which is in a bending state currently, and a current bending radian parameter of the bending area.

In a specific implementation process, the current bending state parameters may be obtained through at least two following ways, one is to dispose a pressure sensor array inside the display unit, and the other is to dispose a mutual inductance unit, which are described in detail in the following.

The first way is to dispose the pressure sensor array inside the display unit.

As shown in FIG. 2, the pressure sensor array may be disposed on a display layer 201 on a surface of the electronic device, on an elastic layer 202 between the display layer 201 and components of the electronic device, and a pressure sensing unit layer 203 between the display layer 210 and the elastic layer 202.

In a specific implementation process, the elastic layer 202 may be made of material with elastic force changing with bending degree, such as thermoplastic elastomer or rubber.

In a specific implementation process, multiple pressure sensing units 204 may be disposed on a surface of the pressure sensing unit layer 203, which faces the elastic layer 202, so that the pressure sensing units 204 are capable of receiving pressure from the elastic layer 202 when the elastic layer 202 is bended as the display layer 201 is bended.

According to the embodiment of the disclosure, in a case that the pressure sensing units are disposed inside the display unit, the process of obtaining the current bending state parameters for characterizing a current bending state of the display unit includes:

obtaining, through the pressure sensing units 204, parameters of current pressure from the display layer 201 and the elastic layer 202 on the pressure sensing units; and calculating the current bending state parameters for characterizing the current bending state of the display unit based on the current pressure parameters.

A calculation method for the current bending state parameters of the display unit is illustrated in conjunction with FIG. 3 in the following.

It is assumed that the current pressure parameter received by a first sensing unit 301 disposed on the pressure sensing unit layer 203 is F, a bending degree parameter of a first display area 302 to which a distance from the first sensing unit 301 is smaller than a threshold may be obtained through the following mechanics formula:

$$\theta = \frac{Fl^2}{2EI},$$

where as shown in FIG. 3, $\theta$ is the bending degree of the first display area 302 with respect to a predetermined display area 303 of the display unit, l is a distance between the first display area 302 and the predetermined display area 303 on the bending surface of the display unit, and EI is known stiffness of the elastic layer 202.

Through the calculation method, the current bending state parameters for any area of the display unit which is disposed with the pressure sensing unit may be calculated.

Specifically, the way, in which the current bending state parameters of the display unit is obtained through disposing the pressure sensing units inside the display unit, has low calculation amount, has no need to perform calculation with large calculation amount such as three-dimensional reconstruction, may improve display efficiency, and is more applicable to display video images.

The second way is to dispose the mutual inductance units inside the display unit.

Figure 4:
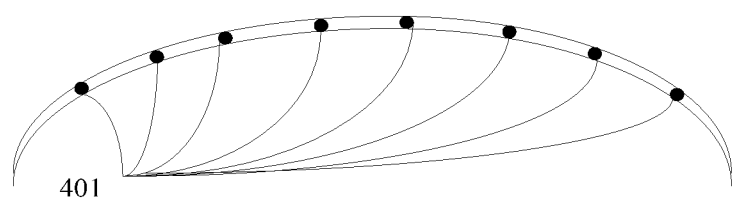
FIG. 4 is a schematic diagram of a display unit provided with built-in mutual inductance units according to the first embodiment of the disclosure.

Referring to FIG. 4, as shown in FIG. 4, multiple mutual inductance units 401 are disposed inside the display unit. Each mutual inductance unit may be configured to be capable of sensing relative distances and relative orientations of the other mutual inductance units, alternatively, a sensor module may be disposed inside the electronic device, and relative distances and relative orientations of each mutual inductance unit are acquired through the sensing module.

After coordinate data including relative distances and relative orientations for each mutual inductance unit is acquired, current coordinate point for each mutual inductance unit may be labeled in a preset three dimension coordinate axis through the coordinate data.

According to the current coordinate point for each mutual inductance unit, the bending state of the display unit may be obtained and the current bending state parameters may be obtained through a structure from motion (SFM) algorithm and/or a trend simulation algorithm.

In a specific implementation process, the mutual inductance units may be wireless units which are capable of transmitting and receiving wireless signal to each other, alternatively, the mutual inductance units may be magnetic units magnetically attracted to each other, and are not limited according to the embodiment.

In a specific implementation process, ways for obtaining the current bending state parameters are not limited to the two foregoing ways, alternatively, the current bending state parameters of the display unit may be obtained through collecting a current image of the display unit by using an image acquisition unit of the electronic device, and the ways are not limited according to the embodiment.

After the current bending state parameters are obtained through step S101, step S102 is executed to acquire the first plane image from memory.

Specifically, after the notification signal for notifying the electronic device that the first plane image needs to be displayed is received, the first plane image may be stored in memory in term of pixels according to the size of the display area of the display unit, thereby facilitating subsequent image processing for the first plane image.

After the current bending state parameters are obtained, an image processing unit may read the first plane image from the memory, alternatively, the image processing unit may receive the first plane image which is read from the memory and transmitted to the image processing unit by other units, which is not limited according to the embodiment.

In step S103 and step S104, image processing is performed on the first plane image to obtain the second image according to the current bending state parameters; transmitting the second image to video memory of the display unit, to make a projected image of the second image on a preset plane is the same as the first plane image when the second image is displayed on the display unit in a curved surface shape.

In a specific implementation process, the user often views images displayed on the display unit from a direction facing the display unit, therefore the preset plane is set as a plane facing the display unit.

In a specific implementation process, the process of performing image processing on the first plane image according to the current bending state parameters may include following two image processing ways.

The first way is to perform local stretch processing, local rotation processing and/or local shift processing according to the current bending state parameters.

That is, local stretch processing, local rotation processing and/or local shift processing is performed on the first plane image according to the current bending state parameters, and interpolation processing is then performed on the first plane image through the k-means algorithm or the trend simulation algorithm to obtain the second image with good continuity.

Figure 5:
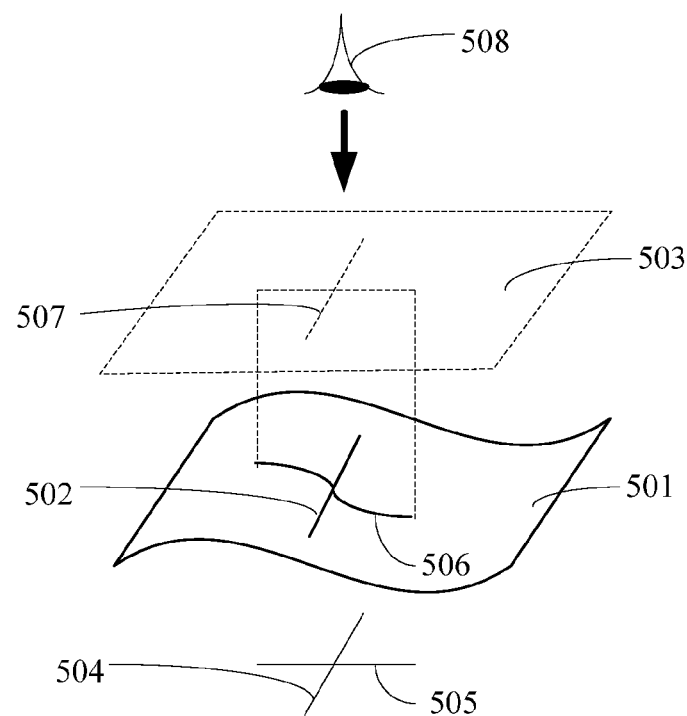
FIG. 5 is a schematic diagram of an image processing principle according to the first embodiment of the disclosure.

Referring to FIG. 5, in order that on a preset plane 503, projection of the second image 502 displayed on the display unit 501 is the same as the first plane image 504, as shown in FIG. 5, the first way includes:
  performing stretch processing on a first line 505 on the first plane image 504 according to the bending state parameters of the display unit 501;
  performing interpolation processing on the stretched first line 505 according to an interpolation algorithm to generate a continuous line 506, thereby generating the second image 502; and
  transmitting the second image 502 to video memory of the display unit 501, so that the display unit 501 displays the second image 502, and on the preset plane 503, projection of the displayed second image 502 is the same as the first plane image 504.

When a user faces the display unit 501, he/she may acquire, through the bending display unit 501, content of the first plane image 504 instead of content of the first plane image 504 with bending deformation. Therefore, visual effects and user experience can be improved.

The second way is to locally enlarge or locally shrink the stretched and/or rotated image.

In a specific implementation process, for lines with a same thickness displayed on the display unit, the user senses that a line in an area closer to the he/she is thicker than that in an area farther from he/she, therefore for sensing original thickness of the line without affection of distances to the display areas, the second image may be locally enlarged or locally shrinked.

That is, after the interpolation processing is performed on the first plane image to obtain the second image through the k-means algorithm or the trend simulation algorithm, the method further includes:
  in a concave area of the surface of the display unit, performing local zoom processing on the second image according to the current bending state parameters and preset display position parameters for characterizing a display position of the second image on the display unit, so that the display size of the second image displayed on the display unit gradually decreases along a direction from a vertex of the concave area to a endpoint of the concave area; and
  in a convex area of the surface of the display unit, performing local zoom processing on the second image according to the current bending state parameters and the display position parameters, so that the display size of the second image displayed on the display unit gradually increases along a direction from a vertex of the convex area to a endpoint of the convex area.

In another aspect, based on a same idea of the disclosure, an electronic device corresponding to the method according to the first embodiment is provided according to another embodiment of the disclosure, and is described in detail according to a second embodiment.

Second Embodiment

Figure 6:
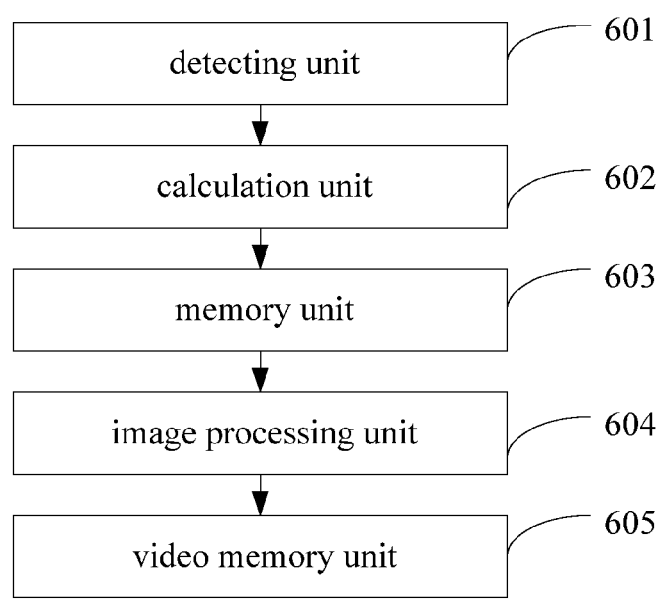
FIG. 6 is a structural diagram of an electronic device according to a second embodiment of the disclosure.

According to the second embodiment, an electronic device is provided. The electronic device includes a display unit which is capable of being bended with certain curvature. Referring to FIG. 6, which is a structural diagram of the electronic device according to the second embodiment of the disclosure, the electronic device further includes:
  a detecting unit 601, configured to detect current pressure parameters sensed by pressure sensing units of the electronic device based on a notification signal for notifying the electronic device that a first plane image needs to be displayed once the notification signal is received;
  a calculation unit 602, configured to calculate current bending state parameters for characterizing a current bending state of the display unit according to the current pressure parameters;
  a memory unit 603, configured to store the first plane image;
  an image processing unit 604, configure to perform image processing on the first plane image stored in the memory unit 603 to generate a second image based on the current bending state parameters calculated by the calculation unit 602; and
  a video memory unit 605, configured to receive the second image generated by the image processing unit

604, and display the second image on the display unit, where on a preset plane, a projected image of the second image displayed on the display unit in the curved shape is the same as the first plane image.

In practical application, the electronic device may be a smart watch, a smart band, a smart headset device, a smart phone, or a tablet computer, etc, and is not enumerated according to the embodiment.

In a specific implementation process, the display unit may be a flexible display screen, or a thin display screen with certain elasticity, thereby implementing that the display unit is capable of being bended with certain curvature.

According to the embodiment of the disclosure, the display unit includes:
- a display layer, disposed on a surface of the display unit;
- an elastic layer, disposed between the display layer and internal components of the electronic device; and
- the pressure sensing units, which are disposed between the display layer and the elastic layer and are capable of acquiring the parameters of current pressure from the display layer and the elastic layer on the pressure sensing units.

According to the embodiment of the disclosure, the electronic device further includes:
- an acquiring unit, configured to acquire the first plane image from the memory unit, and transmit the first plane image to the image processing unit.

According to the embodiment of the disclosure, the image processing unit is further configured to perform interpolation processing on the first plane image to obtain the second image through a k-means algorithm or a trend simulation algorithm according to the current bending state parameters.

According to the embodiment of the disclosure, the image processing unit is further configured to:
- in a concave area of the surface of the display unit, perform local zoom processing on the second image according to the current bending state parameters and preset display position parameters for characterizing a display position of the second image on the display unit, so that the display size of the second image displayed on the display unit gradually decreases along a direction from a vertex of the concave area to a endpoint of the concave area; or
- in a convex area of the surface of the display unit, perform local zoom processing on the second image according to the current bending state parameters and the display position parameters, so that the display size of the second image displayed on the display unit gradually increases along a direction from a vertex of the convex area to a endpoint of the convex area.

The electronic device provided according to this embodiment and the method for processing information provided according to the first embodiment are based on two aspects of a same idea of the invention. The implementation process of the method is described in detail in the foregoing, therefore those skilled in the art may understand the structure and the implementation process of the electronic device in this embodiment according to the foregoing clear description, and the structure and the implementation process of the electronic device are not described herein for simplicity.

The technical solutions according to the embodiments of the disclosure have at least technical effects and advantages as follows.

Through the method and the electronic device provided according to the embodiments of the disclosure, image processing is performed on a first plane image needing to be displayed to obtain a second image according to bending state parameters of a display unit, so that on a preset plane, a projected image of the second image displayed on the display unit of a curved surface shape is the same as the first plane image. Therefore, a user views same content from both the second image displayed on the bending display unit and the first plane image displayed on the flat display unit, so as to improve visual effect and user experience.

It should be understood by those skilled in the art that, the embodiments according to the present disclosure may be implemented as a method, system or computer program product. Hence, the embodiments of the invention may be implemented with hardware only, with software only, or with a combination of hardware and software. A form that computer program product is implemented on one or more storage mediums (include, but is not limited to a disk storage, CD-ROM and an optical storage, etc), which are applicable to a computer and include program code applicable to the computer, may be used according to the disclosure.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to achieve a machine, in which device(s) to implement functions specified in one or more processes of the flowchart and/or one or more blocks of the block diagram is(are) achieved through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Computer program instructions corresponding to the information processing method according to the embodiment of the disclosure may be stored on a storage medium such as a compact disk, a hand disk and a universal serial bus (USB) disk.

For the method for processing information provided according to the first embodiment, when the computer instructions corresponding to the method for processing information which are stored in the storage medium are read or executed, the reading or execution process includes following steps:

once notification signal for notifying the electronic device that a first plane image needs to be displayed is received, detecting and obtaining current bending state parameters for characterizing a current bending state of the display unit based on the notification signal;

acquiring the first plane image from memory;

performing image processing on the first plane image to obtain a second image according to the current bending state parameters; and transmitting the second image to video memory of the display unit, to make a projected image of the second image on a preset plane is the same as the first plane image when the second image is displayed on the display unit in a curved surface shape.

Optionally, in a case that the display unit includes a display layer disposed on a surface of the display unit, an elastic layer disposed between the display layer and internal components of the electronic device, and pressure sensing units disposed between the display layer and the elastic layer, during execution for computer instructions stored in the storage medium corresponding to steps for obtaining current bending state parameters for characterizing a current bending state of the display unit, the execution process includes following steps:

obtaining, through pressure sensing units, parameters of current pressure from the display layer and the elastic layer on the pressure sensing units; and calculating the current bending state parameters for characterizing the current bending state of the display unit based on the current pressure parameters.

Optionally, the current bending state parameters include a current bending position parameter for characterizing a position for a bending area of the display unit which is in a bending state currently, and a current bending radian parameter of the bending area.

Optionally, during execution for computer instructions stored in the storage medium corresponding to the step for performing image processing on the first plane image to obtain a second image according to the current bending state parameters, the execution process includes following steps:

performing, according to the current bending state parameters, interpolation processing on the first plane image to obtain the second image through the k-means algorithm or the trend simulation algorithm.

Optionally, some other computer instructions are stored in the storage medium, these computer instructions are executed after execution for computer instructions corresponding to the step for performing, according to the current bending state parameters, interpolation processing on the first plane image to obtain the second image through the k-means algorithm or the trend simulation algorithm, and the execution process for these computer instructions includes following steps:

in a concave area of the surface of the display unit, performing local zoom processing on the second image according to the current bending state parameters and preset display position parameters for characterizing a display position of the second image on the display unit, so that the display size of the second image displayed on the display unit gradually decreases along a direction from a vertex of the concave area to an endpoint of the concave area; or in a convex area of the surface of the display unit, performing local zoom processing on the second image according to the current bending state parameters and the display position parameters, so that the display size of the second image displayed on the display unit gradually increases along a direction from a vertex of the convex area to a endpoint of the convex area.

Preferred embodiments of the disclosure are described, and once the basic creative idea is learned, persons of skill in the art may make additional alternations and modifications on these embodiments. Therefore, the claim intends to be explained to include embodiments and all alternations and modifications within the scope of the disclosure.

Apparently, some modifications and variants may be made by those skilled in the art within the scope and spirit of the disclosure.

In this way, if the modifications and variants are within the scope of the claims of the disclosure and equivalent technology of the claims, the disclosure also intends to include the modifications and variants.

The invention claimed is:

1. A method for processing information, applied to an electronic device with a display unit, wherein the display unit has an ability of being bended with certain curvature, the method comprising:

once notification signal for notifying the electronic device that a first plane image needs to be displayed is received, detecting and obtaining current bending state parameters for characterizing a current bending state of the display unit based on the notification signal;

acquiring the first plane image from memory;

performing image processing on the first plane image to obtain a second image according to the current bending state parameters;

transmitting the second image to video memory of the display unit to make a matched image of the second image on a preset plane is the same image as the first plane image when the second image is displayed on the display unit having a curved surface shape;

wherein the display unit comprises a display layer disposed on a surface of the display unit, an elastic layer disposed between the display layer and internal components of the electronic device, and pressure sensing units disposed between the display layer and the elastic layer, and wherein obtaining the current bending state parameters for characterizing the current bending state of the display unit comprises obtaining, via the pressure sensing units, parameters of current pressures, wherein the parameters of the current pressures are indicative of pressures of the display layer and the elastic layer on the pressure sensing units, and calculating the current bending state parameters for characterizing the current bending state of the display unit based on the parameters of current pressures; and performing a partial scale processing on the second image according to the current bending state parameters and a display position parameter.

2. The method according to claim 1, wherein the current bending state parameters comprise a current bending position parameter for characterizing a position of a bending area of the display unit which is in the current bending state and a current bending radian parameter of the bending area.

3. The method according to claim 1, wherein performing image processing on the first plane image according to the current bending state parameters comprises performing, according to the current bending state parameters, interpolation processing on the first plane image to obtain the second image via a k-means algorithm or a trend simulation algorithm.

4. The method according to claim 3, wherein after performing, according to the current bending state parameters, interpolation processing on the first plane image to obtain the second image via the k-means algorithm or the trend simulation algorithm, the method further comprises:
- in a concave area of the surface of the display unit, performing partial scale processing on the second image according to the current bending state parameters and preset display position parameters for characterizing a display position of the second image on the display unit, such that a display size of the second image displayed on the display unit gradually decreases along a direction from a vertex of the concave area to an endpoint of the concave area; and
- in a convex area of the surface of the display unit, performing partial scale processing on the second image according to the current bending state parameters and the display position parameters, such that the display size of the second image displayed on the display unit gradually increases along a direction from a vertex of the convex area to an endpoint of the convex area.

5. An electronic device comprising a display unit, wherein the display unit has an ability of being bended with certain curvature, the electronic device further comprising:
- a detecting unit configured to detect current pressure parameters sensed by pressure sensing units of the electronic device based on a notification signal for notifying the electronic device to display a first plane image once the notification signal is received;
- a calculation unit configured to calculate current bending state parameters for characterizing a current bending state of the display unit according to the current pressure parameters detected by the detecting unit;
- a memory unit configured to store the first plane image;
- an image processing unit configure to perform image processing on the first plane image stored in the first memory unit to generate a second image based on the current bending state parameters calculated by the calculation unit; and
- a video memory unit configured to receive the second image generated by the image processing unit and display the second image on the display unit, wherein on a preset plane a matched image of the second image, displayed on the display unit of the curved surface shape, is a same image as the first plane image, wherein the display unit comprises
- a display layer disposed on a surface of the display unit,
- an elastic layer disposed between the display layer and internal components of the electronic device, and
- the pressure sensing units disposed between the display layer and the elastic layer, wherein the current pressure parameters are indicative of pressures of the display layer and elastic layer on the pressure sensing units, and wherein the image processing unit is further configured to perform a partial scale processing on the second image according to the current bending state parameters and a display position parameter.

6. The electronic device according to claim 5, wherein the electronic device further comprises an acquiring unit configured to acquire the first plane image from the memory unit and transmit the first plane image to the image processing unit.

7. The electronic device according to claim 5, wherein the image processing unit is further configured to perform, according to the current bending state parameters, interpolation processing on the first plane image to obtain the second image via a k-means algorithm or a trend simulation algorithm.

8. The electronic device according to claim 7, wherein the image processing unit is further configured to:
- in a concave area of the surface of the display unit, perform partial scale processing on the second image according to the current bending state parameters and preset display position parameters for characterizing a display position of the second image on the display unit, such that a display size of the second image displayed on the display unit gradually decreases along a direction from a vertex of the concave area to an endpoint of the concave area; or
- in a convex area of the surface of the display unit, perform partial scale processing on the second image according to the current bending state parameters and the display position parameters, such that the display size of the second image displayed on the display unit gradually increases along a direction from a vertex of the convex area to an endpoint of the convex area.

* * * * *

UNITED STATES PATENT AND TRADEMARK OFFICE
CERTIFICATE OF CORRECTION

PATENT NO.        : 9,779,522 B2
APPLICATION NO.   : 14/584705
DATED             : October 3, 2017
INVENTOR(S)       : Fulei Tian It is certified that error appears in the above-identified patent and that said Letters Patent is hereby corrected as shown below:

In the Specification
At Column 6, Line 25 of the formula, delete "El" and insert -- EI --
At Column 6, Line 32, delete "1" and insert -- I --

In the Claims
At Column 13, Claim 5, Line 36, delete "a memory" and insert -- a first memory --

Signed and Sealed this
Nineteenth Day of December, 2017

Joseph Matal
*Performing the Functions and Duties of the
Under Secretary of Commerce for Intellectual Property and
Director of the United States Patent and Trademark Office*